(No Model.)

F. A. LA ROCHE.
VOLT AMMETER.

No. 481,573. Patented Aug. 30, 1892.

Witnesses:
Henry Drury
J. W. Donath

Inventor:
Fredrick A. LaRoche
per
Mark Wilks Collet
atty.

UNITED STATES PATENT OFFICE.

FREDRICK A. LA ROCHE, OF PHILADELPHIA, PENNSYLVANIA.

VOLT-AMMETER.

SPECIFICATION forming part of Letters Patent No. 481,573, dated August 30, 1892.

Application filed September 1, 1891. Serial No. 404,463. (No model.)

*To all whom it may concern:*

Be it known that I, FREDRICK A. LA ROCHE, a citizen of the United States, and a resident of the city and county of Philadelphia, and State of Pennsylvania, have invented a new and useful Improvement in Volt-Ammeters, of which the following is a specification, reference being had to the drawings annexed.

My invention relates to the class of devices for measuring electrical currents which are operated by means of the repulsion between two electro-magnet cores, magnetized by the passage of the current to be measured, and is fully described in the following portions of my specification.

Figure 1:
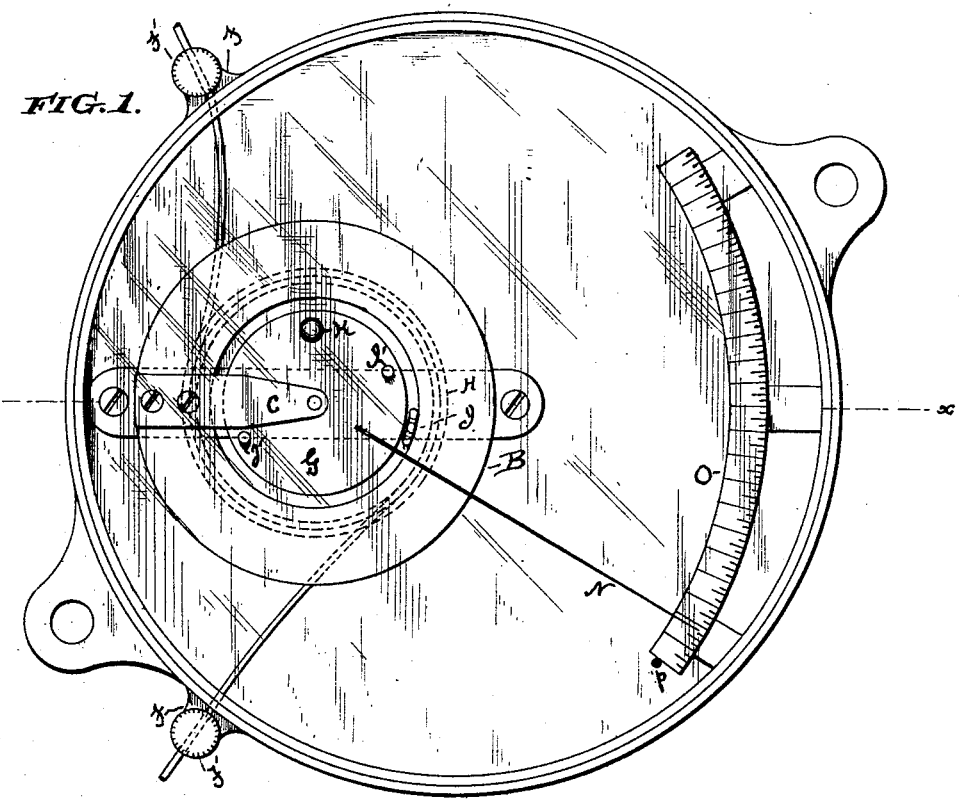
Figure 2:
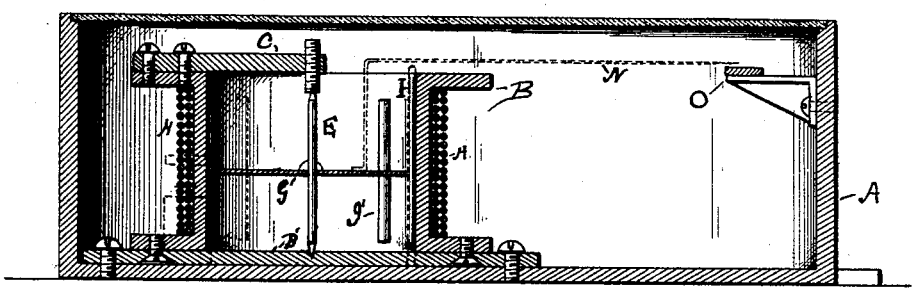

Figure 1 is a plan view of a type of my improved device. Fig. 2 is a sectional view of same through the line $x\ x$ of Fig. 1.

I make the case A, in which my device is placed, in any ordinary manner. The usual cylindrical brass case—such as aneroid barometers or similar instruments are inclosed in—is very convenient for use in this connection. This case has attached to it binding-posts F F and screws F' F', or other devices for this purpose, and electrical connections uniting these posts with the coil through which the current is passed to produce the magnetization of the electro-magnets. These parts may be varied at will by a skilled mechanic and form no limitation on my invention.

To the case A, I secure the reel B, which may very conveniently be done by means of screws, to a piece B', which is similarly in turn secured to the back of the case A. Upon this reel I wind the coil H, through which passes the current. Of course the reel and other parts where they would, if magnetized, affect the action of the core to be described, must be made of a non-magnetic substance, as brass or wood. The size of the wire forming the coil H and the number of the windings depend upon the sensitiveness desired and the amount of resistance desired to be introduced into the circuit by the instrument when included therein. This coil will magnetize any piece of soft iron or other magnetizable metal placed transverse to the length of the wires forming the coil and in the electric field produced thereby. To form this core, I place a bar of soft iron or other suitable metal I, preferably small, and in the interior of the coil H transverse to the wires of said coil. The opposite ends of the bar I, of course, when a current passes through the reel becomes of opposite polarity and tend to repel any magnet presented with the like poles to like. If, therefore, a bar of soft iron or other suitable magnetizable metal is placed parallel substantially to the bar I and connected to the pointer by connections translating its movement to a movement of the pointer along the scale, an operative measuring-instrument is produced, as the pointer will be deflected from the zero-point on the scale in proportion to the current passing through the coil and magnetizing the magnets.

I consider the most advantageous mechanical construction of the movable mountings on which the movable magnet is placed and of the connections joining it to the pointer to transfer the motion of repulsion of the magnets thereto is as follows: I place in the center of the coil H a spindle E, suitably pivoted to revolve freely—for instance, between bearings contained on the piece B'—and a piece C, secured to the top of the reel. On this spindle I place a disk G, to which I attach a rod of soft iron or other suitable metal I', set parallel to the core I and toward the side of the disk. The pieces of soft iron or other suitable metal, both at the side of the coil and on the disk, may be increased in number, if desired. To this disk I attach the pointer N, as will hereinafter be described. To bring the pieces of iron or other metal I and I' toward each other, I employ a weight K in instruments intended to be hung against a wall or similar surface and in portable instruments, a spring tending to yieldingly revolve the disk and the movable core placed thereon, and a stop, which the pointer impinges, as will be described hereinafter, preventing the weight or spring from revolving the disk more than such distance as will bring the stationary and movable cores into close propinquity and not to permit them to lie on the same radial line from the axis of rotation. It can be seen in this form of my device that the movable core or cores revolve in a cylindrical plane concentric with the plane of the coils and therefore remain in a magnetic field of substantially the same magnetic strength, the movement diminishing for all small distances, substantially as the square of the distance, which fact makes the scale-divisions of very convenient size. To this disk I attach a pointer N, extending over the scale O, which may very conveniently be placed at one side of the case, and upon this scale at the zero-point a stop *p*, against which the needle will impinge if it tends to move in the wrong direction. This scale can most conveniently be graduated for each instrument by experiment; but when once made it is permanent.

Operation: When the device is put in a circuit carrying a direct current which passes through the coil, said current will magnetize the fixed core or cores, and the movable core or cores making the extremities magnetized with magnetism of the same name adjacent to each other and causing them to separate in proportion to the current. Alternating: When an alternating current passes, the electro-magnets remain relatively to each other of the same polarity, both changing polarity simultaneously with each other and with the change in direction of the current.

What I claim is—

1. The combination of a case, a spool mounted on said case, a scale secured to the sides of said case on a level with the top of the spool, a coil around said spool, a rod of magnetizable material secured to said spool in a direction transverse to said coil, a spindle held rotatably in the center of said coil and supports secured thereto, whereon is placed a rod of magnetizable material parallel to and in the neighborhood of said fixed plate, and a pointer extending over the top of said spool and scale, and means for moving said movable bar of magnetizable material toward the other, substantially as described.

2. The combination of the case, a spool secured to a piece of non-magnetizable material secured to the back plate of said case and having therein a bearing for a spindle, a support secured to the top of said spool and containing an adjustable bearing for said spindle, a coil surrounding said spool, a rotatable spindle mounted centrally in said spool between said bearings, a piece of magnetizable material secured transversely to said coil in the interior of said spool, supports attached to and revoluble with said spindle, a rod of magnetizable material placed parallel to and in the neighborhood of said fixed rod and supported from said supports, a pointer supported from said supports, devices for bringing said pieces of magnetizable metal toward each other, and a scale, all substantially as described.

3. The combination of a circular casing, a bracket-supported scale at one side thereof, a spool holding a coil mounted on the back plate of said casing-supports containing bearings between which is mounted a revoluble spindle, a rod of magnetizable material supported by and secured to the interior of said spool in a direction transverse to the direction of the wires of the coil thereon, a rod of magnetizable material supported substantially at its middle point parallel to said fixed piece of magnetizable material by supports connected to said spindle, a weight, and the curved pointer N, all substantially as described.

In testimony whereof I have hereto set my name in the presence of two subscribing witnesses.

FREDRICK A. LA ROCHE.

Witnesses:
MARK WILKS COLLET,
JOHN R. NOLAN.